United States Patent [19]

Buhrer

[11] Patent Number: 4,634,239
[45] Date of Patent: Jan. 6, 1987

[54] MULTIPLE PORT OPTICAL FIBER SWITCH

[75] Inventor: Carl F. Buhrer, Framingham, Mass.

[73] Assignee: GTE Laboratories Incorporated, Waltham, Mass.

[21] Appl. No.: 637,631

[22] Filed: Aug. 3, 1984

[51] Int. Cl.$^4$ .............................................. G02B 26/08
[52] U.S. Cl. .................................... 350/486; 350/286; 350/287
[58] Field of Search ............... 350/286, 287, 484, 485, 350/486, 511, 526, 574, 96.19

[56] References Cited

U.S. PATENT DOCUMENTS

| 4,322,126 | 3/1982 | Minowa et al. | 350/96.20 |
| 4,329,331 | 12/1980 | Aoyama | 350/96.20 |

OTHER PUBLICATIONS

P. G. Hale and R. Kompfner, "Mechanical Optical Fibre Switch," Elect. Lett., 12(15), 388 (1976).
M. Johnson and R. Ulrich, "Fiber-Optic Relay," Appl. Phys. Lett., 31(10), 675–676 (1977).
M. Stockman, G. Winzer and E. Grassl, "Rigid Reed-Type Routing Switch for Multimode Optical Fibers," Fiber and Integ. Opt., 3(2-3), 237–251 (1980).
T. Ebato, T. Kajiwara and S. Kobayashi, "Mechanical Fibre Optic Switching Using P.V.D.F. Bimorph," Elec. Lett., 16(22), 829–830 (1980).
A. Carenco and L. Menigaux, "InP Electro-Optic Directional Coupler," Appl. Phys. Lett., 40(8), 653–655 (1982).
M. Kondo, Y. Ohta, M. Fujiwara and M. Sakaguchi, "Integrated Optical Switch Matrix for Single Mode Fiber Networks," IEEE J. of Quant. Elec., QE-18(10), 1759–1765 (1982).
M. Haruna and J. Koyama, "Thermooptic Deflection and Switching in Glass," Appl. Opt. 21(19), 3461–3465 (1982).
Y. Fujii, J. Minowa, T. Aoyama and K. Doi, "Low Loss 4×4 Optical Matrix Switch for Fiber-Optic Communications," Elect. Lett., 15(14), 427–428 (1979).
J. Minowa, Y. Fujii, Y. Nagata, T. Aoyama and K. Doi, "Nonblocking 8×8 Optical Matrix Switch for Fiber-Optic Communications," Elect. Lett., 16(11), 422–423 (1980).
R. Watanabe and K. Asatani, "1×2 Optical Switch Using New Type of Pentagonal Prism," Elec. Lett., 16(7), 257–259 (1980).

Primary Examiner—John K. Corbin
Assistant Examiner—Vincent J. Lemmo
Attorney, Agent, or Firm—Fred Fisher

[57] ABSTRACT

A multiple port electromechanical optical fiber switch provides for the exchange redirection of one common optical path with one of several other optical paths through the switch. It is particularly useful when one standby laser transmitter must be quickly substituted for any single failed transmitter among a group of several actively operating transmitters. A prism for exchanging the optical paths of two initially parallel beams by means of four refractions at their entry and exit points and at least two internal reflections per beam within the prism is set forth in modified rhombic form with two additional parallel facets that transmit undeflected in the deactivated position one of two beams so as to minimize required shift distance to the prism activated position where it exchanges the optical paths of both parallel beams.

7 Claims, 12 Drawing Figures

MULTIPLE PORT OPTICAL FIBER SWITCH

BACKGROUND OF THE INVENTION

1. Field of the Invention

This invention relates to a multiple port optical fiber switch for providing for the exchange redirection of one common optical path with one of a plurality of other optical paths. It further relates to a prism for exchanging the optical paths of two initially parallel beams by means of four refractions at their entry and exit points and two internal reflections per beam within the prism. Accordingly, it is a general object of this invention to provide new and improved switches and prisms of such character.

2. Introduction

There are a variety of applications, in fiber optics communications systems, for switches that are capable of reconnecting a set of n input lines to n output lines. A particular type of such a switch is required in a system in which several laser transmitters are feeding data signals into an equal number of fiber circuits and one additional laser transmitter is operating with a test signal in a standby mode ready to serve as a replacement if any one active transmitter should fail. Such a complex switching function could be implemented by interconnecting a network of simpler 2×2 matrix array switches, but this would result in the passage of optical signals successively through several switching devices and could result in excessive cumulative signal loss.

3. Description of the Prior Art

As a means of complying with the duty of disclosure set forth in 37 CFR 1.56, the following listing of publications may be considered to be pertinent. A concise explanation of the relevance of each of the listed items is indicated by the references set forth in the following paragraphs with the various cited items being indicated by superscript reference numerals. This disclosure statement shall not be construed as a representation that a search has been made or that no other material information as defined in 37 CFR 56(a) exists.

1. P. G. Hale and R. Kompfner, "Mechanical Optical Fibre Switch," Elec. Lett. 12(15), 388 (1976).
2. M. Johnson and R. Ulrich, "Fiber-Optic Relay," Appl. Phys. Lett. 31(10), 675-676 (1977).
3. M. Stockman, G. Winzer, and E. Grassl, "Rigid Reed-Type Routing Switch for Multimode Optical Fibers," Fiber and Integ. Opt. 3(2-3), 237-251 (1980).
4. T. Ebato, T. Kajiwara, and S. Kobayashi, "Mechanical Fibre Optic Switching Using P.V.D.F. Bimorph," Elec. Lett. 16(22), 829-830 (1980).
5. A. Carenco and L. Menigaux, "InP Electro-Optic Directional Coupler," Appl. Phys. Lett. 40(8), 653-655 (1982).
6. M. Kondo, Y. Ohta, M. Fujiwara, and M. Sakaguchi, "Integrated Optical Switch Matrix for Single Mode Fiber Networks," IEEE J. of Quant. Elec. QE-18(10), 1759-1765 (1982).
7. M. Haruna and J. Koyama, "Thermooptic Deflection and Switching in Glass," Appl. Opt. 21(19), 3461-3465 (1982).
8. Y. Fujii, J. Minowa, T. Aoyama, and K. Doi, "Low Loss 4×4 Optical Matrix Switch for Fiber-Optic Communications," Elec. Lett. 15(14), 427-428 (1979).
9. J. Minowa, Y. Fujii, Y. Nagata, T. Aoyama, and K. Doi, "Nonblocking 8×8 Optical Matrix Switch for Fibre-Optic Communications," Elec. Lett. 16(11), 422-423 (1980).
10. R. Watanabe and K. Asatani, "1×2 Optical Switch Using New Type of Pentagonal Prism," Elec. Lett. 16(7), 257-259 (1980).

Various optical fiber switches have been devised in the past. Some switches[1-4] electromechanically recouple the end of one fiber alternatively to the ends of two other fibers. These have been most successful with multimode fibers where the alignment is not as critical as with single mode fibers. In others[5-7], the light from the fibers is coupled into a planar waveguide system in thin film devices where its path is controlled by means of an electro-optic or thermo-optic effect. Most of these switches require the light from the fiber to be polarized for proper operation; however, with the exception of thermo-optic devices, they operate at very high speeds.

In another class of switches for optical fibers, light can be manipulated in free space after emerging from the fiber and being focused into a parallel beam by a lens connector device, such as disclosed and claimed in U.S. Pat. No 4,421,383, issued Dec. 20, 1983, to Carlsen, and assigned to the common assignee of this specification. Such a connector can include, in one small part, a conical fiber alignment port and a lens surface to focus the wave into a parallel beam, such as disclosed in pending U.S. patent application No. 454,943, "Optical Fiber Centering Device", filed Jan. 3, 1983, by Paul Melman and W. John Carlsen, and assigned to the common assignee of this specification, a continuation-in-part of U.S. patent application Ser. No. 223,192, filed Jan. 7, 1981. Use of such connectors on opposite sides of a free space optical switch greatly relaxes the lateral alignment requirements of the assembly.

Several such free-space beam switches using electromechanically driven prisms have been described. In one[8], two parallel input beams switch output positions when a rhombic glass prism is inserted into their paths so as to cause them to cross each other. A pair of electromagnets are required to move the prism into and out of the beam switching position. In another[9], a square array of pentagonal prisms is used to implement an 8×8 switch matrix. In both cases, a linear prism drive that maintains accurate orientational alignment is required. In still another[10], a pentagonal prism is described that makes use of total internal reflection while giving a fixed 90° beam deviation.

SUMMARY OF THE INVENTION

Another object of this invention is to provide a new and improved multiple port optical beam switch with a geometry particularly suitable for the exchange redirection of one common optical path with one of several other optical paths.

Still another object of the invention is to provide for a new and improved beam path exchanging prism that is significantly smaller in size and operates with smaller angles of incidence than corresponding beam path exchanging prisms of the prior art.

Yet another object of this invention is to provide in this smaller prism three optical paths, two of which give a path exchange between two parallel beams when the prism is in an activated position, while the third permits the prism to intercept and transmit undeflected one of the beams when the prism is in a deactivated position separated from the activated position by only one half of the spacing between the parallel beams.

In accordance with one aspect of the invention, a prism for exchanging the optical paths of two initially parallel beams by means of four refractions at their entry and exit points and two internal reflections per beam within the prism includes a homogenous transparent solid having a central axis. A first pair of opposed planar faces are equally displaced from and parallel to the axis, and a second pair of opposed planar faces are equally displaced from and parallel to the axis. There is one face on each pair that contains an entry point; the other face of each pair contains an exit point. There is a plane of symmetry through the prism such that the one face of the first pair that contains the entry point and the other face of the second pair that contains the exit point each forms an angle $\alpha$ with the plane of symmetry, and such that the other face of the first pair that contains the exit point and the one face of the second pair that contains the entrance point each forms the angle $\alpha$ with the plane of symmetry. The entry points and the exit points are so oriented that a first line joining the entry point on the one face of the first pair with the exit point on the other face of the second pair, and a second line joining the exit point on the other face of the first pair with the entrance point on the one face of the second pair are parallel to each other and are each perpendicular to the plane of symmetry. Thus, a central ray of one of the two initially parallel beams when impinged upon the entrance point on the one face of the first pair of faces and coaligned with the first line so as to form an angle of incidence with the one face, of the first pair, of the angle $\alpha$ is refracted at an angle $\beta$ of refraction toward a reflecting point on the other face of the second pair of faces, at an angle $\gamma$ of reflection. Then, it is reflected at the angle of reflection $\gamma$ toward a reflecting point on the one face of the second pair of faces, at an angle of reflection of the angle $\gamma$ therewith. Then, it is reflected at the angle of reflection $\gamma$ toward the exit point on the other face of the first pair of faces and, then, it is refracted at the angle of refraction $\beta$ to coalign with the second line. Further, when a central ray of the other of the two initially parallel beams is impinged upon the entrance point on the one face of the second pair of faces and coaligned with the second line so as to form an angle of incidence, with the one face of the second pair, of the angle $\alpha$, it is refracted at an angle of refraction of the angle $\beta$ toward a reflecting point on the other face of the first pair of faces at an angle of reflection of the angle $\gamma$ therewith. Then, it is reflected at the angle of reflection $\gamma$ toward a reflecting point on the one face of the first pair of faces, at the angle of reflection $\gamma$ therewith. Then, it is reflected at the angle of reflection $\gamma$ toward the exit point on the other face of the second pair of faces. Then, it is refracted at the angle of refraction $\beta$ to coalign with the first line. In accordance with certain features of the invention, the prism can include an additional pair of opposed parallel faces, each of the additional faces being equally spaced from and parallel to the plane of symmetry. The angle $\alpha$ can be 30°, the distance between the two lines can be 0.5 inch, and the distance between one face and the other face of each pair of faces can be 0.3433 inch. The prism can utilize Schott optical glass type SF15 having a refractive index of 1.67 at the operating wavelength of 1.3 microns.

In accordance with another aspect of the invention, apparatus provides for the exchange redirection of one common optical path with one of a plurality of other optical paths, wherein other optical paths are oriented in a circular configuration so that each path is parallel to each other and is perpendicular to a plane containing the configuration. The other paths intersect the plane at intersections whose locus lies in the circular configuration. The common optical path is parallel to the other paths and intersects the plane at the center of the circular configuration. Such apparatus can include a like plurality of the prisms, as set forth hereinabove, oriented so that light can pass unimpeded through the other optical paths. Such apparatus can further include positioning means for a prism so that the entrance point on one face of a first pair of faces of such prism intersects the common optical path, and so that the exit point on the other face of the first pair of faces intersects an optical path corresponding to the positioned prism. Thus, light can pass from the common optical path, be refracted upon entering the positioned prism, be reflected twice within the positioned prism, and be refracted upon exiting from the last named exit point to coalign with the corresponding optical path. In accordance with certain features of the invention, the aforesaid plurality can be eight.

The entrance point on one face of a second pair of faces of such prism can intersect the common optical path, and the exit point in the other face of the second pair of faces can intersect the common optical path so that light can pass from a replaced light source along the corresponding optical path, be refracted upon entering the positioned prism, be reflected twice within the positioned prism, and be refracted upon exiting from the last named exit point to coalign with the common optical path, and be detected by a suitable detector to indicate that the replaced light source is operative.

BRIEF DESCRIPTION OF THE DRAWINGS

Other objects, advantages and features of this invention, together with its construction and mode of operation, will become more apparent from the following description, when read in conjunction with the accompanying drawings, in which.

DESCRIPTION OF PREFERRED EMBODIMENT(S)

Figure 1:
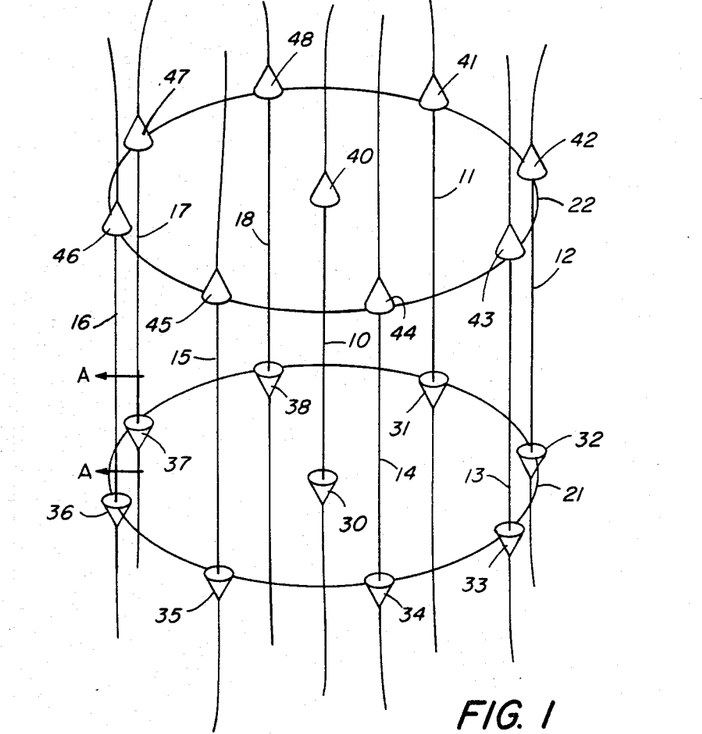
FIG. 1 is a diagram illustrating the optical geometry of one embodiment of this invention.

The optical geometry of one embodiment of the invention is depicted in FIG. 1. One central beam path 10 extends in a straight line between fiber lens connector bodies 30 and 40. Eight equally spaced paths 11 through 18 surround the path 10 and are parallel to it and to each other. Each of the paths 11 through 18 is terminated at both ends by fiber lens connectors 31 through 38 and 41 through 48. The set of input fiber lens connector bodies 30 through 38 are located at the center of and on the circumference of a circle 21 on one side of a switch housing while the set of output fiber connector bodies 40 through 48 are located at the center of and on the circumference of a circle 22 on the opposite side of the housing.

Figure 1A:
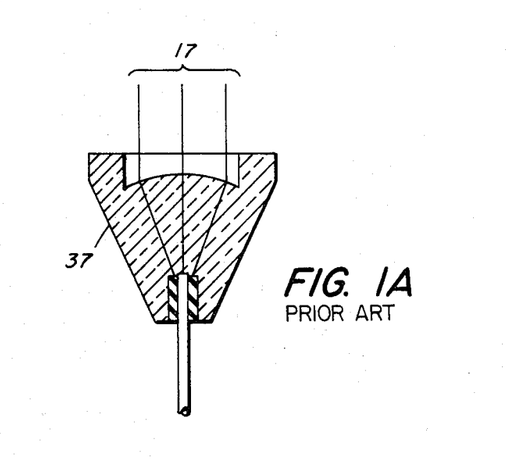
FIG. 1A is a cross-sectional view of an optical fiber lens connector body, taken along the line A—A of FIG. 1.

An optical fiber connector body 37 is, preferably, an expanded beam connector, such as depicted in the aforesaid U.S. Pat. No. 4,421,383. There, an optical fiber connector body, molded of optical quality transparent plastic, has a reference surface, a lens having a convex surface molded into the connector body recessed inward from the reference surface, and a third surface forming a focal plane of the lens and having a point thereon one focal length from the lens surface. The third surface is parallel to the reference surface. With such a connector body, an optical fiber can be brought close to the aforesaid point. Light traveling through the fiber is expanded by the connector body and emerges from the lens' convex surface as an expanded beam 17, as depicted in FIG. 1A.

Figure 2:
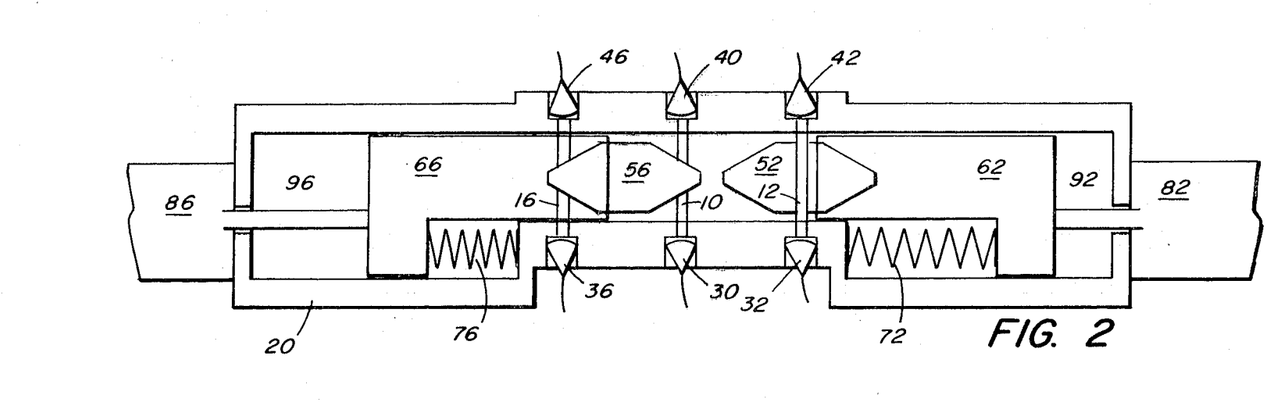
FIG. 2 is a cross-sectional view of the circular embodiment depicted in FIG. 1 taken along a diagonal thereof.

A cross-section of the housing 20 that includes the three optical beam paths 10, 12, 16 (shown in FIG. 1) is shown in FIG. 2. Each of the paths 11 through 18 has a respective glass prism 51 through 58 associated therewith. Referring to FIG. 2, there is shown two glass prisms 52, 56 which are associated, respectively, with the paths 12, 16. Each glass prism is mounted in a carrier that permits it to slide radially along a track toward a center optical beam path 10. A carrier 62, into the end of which the prism 52 is mounted, is shown in its normally deactivated position to which it and a push rod 92 of a solenoid 82 are returned by a spring 72. In contradistinction, a carrier 66 into which the prism 56 is mounted is shown in an activated position with a spring 76 compressed by a push rod 96 of a solenoid 86. In this activated position, the prism 56 intercepts both beams 16, 10, whereas the deactivated prism 52 remains centered on the beam 12 which passes through its midsection undeflected.

The effects of the prisms 52, 56 on the optical beam paths 12, 16, 10 are shown in detail in FIG. 3. The three rays 12 representing the width and center line of the optical beam from the coupler 32 enter the prism 52 at normal incidence, pass from the bottom facet 23 to the parallel top facet 24 and exit parallel to their original direction on their way toward the output coupler 42. The prism 56, which is in the activated position, exchanges the paths of the beams 16, 10 through refraction and reflection by the parallel facets 25 and 28 and by the parallel facets. 26 and 27. The three rays 16 from the coupler 36 enter the facet 25 where they are refracted toward the facet 26. They undergo total internal reflection at the facets 26 and 27 and exit the prism 56 through the facet 28 parallel to their original direction. Similarly, the three rays 10 enter the facet 27, are reflected at the facets 28 and 25, and exit the prism 56 through the facet 26, also parallel to their original direction. When the prism dimensions are properly chosen, the lateral shift that each beam experiences can be made equal to the spacing between the beams 16 and 10, and the output beams become exactly exchanged in position so that they pass into the output couplers 40 and 46.

Figure 4:
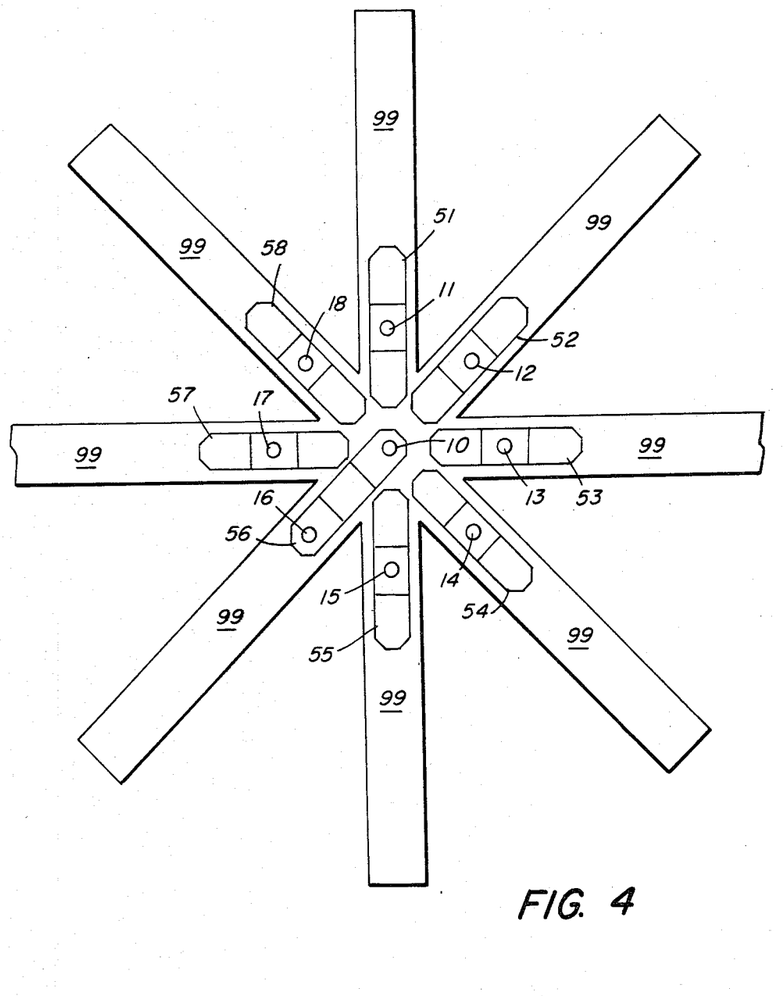
FIG. 4 is a top view of a switch housing, showing the switching prisms therewithin.

A top view of the insides of the switch housing are depicted in FIG. 4. The arrangement of the eight optical beam paths 11 through 18 around the center path 10 is shown along with the orientations of the prisms 51 through 58. Each prism is depicted in its normally deactivated position except the prism 56 which is shown slid into interception with the beam 10 (as also shown in FIG. 2). Each prism has its corners truncated to permit the activated prism to slide freely to the center. The prisms are narrower than the tracks in which the prism carriers 61 through 68 slide, and they extend out from the ends of these carriers, as shown in FIG. 2, because there is only sufficient lateral clearance for the prisms themselves.

The prism geometry of this instant invention is distinguishable over the prior art. In the Fujii et al. article, set forth hereinabove, an optical switch uses a rhombic shaped prism that produces a desired crossover exchange of two parallel light beams as they pass through it. However, in contrast with the prism of this instant invention, no internal reflections take place. In Fujii et al., each beam enters one facet, is refracted toward the opposite facet, and exits there parallel to its original direction. Using the design equation given by Fujii et al., the required prism sizes are drawn to scale in FIG. 5 for glass with a refracture index $n=1.67$, that used in the prism design of the instant invention. The prism design of the instant invention is shown for comparison in FIG. 5D while FIGS. 5A, 5B and 5C show prior art prism sizes required for the same beam shift distance.

Figures 5A, 5D:
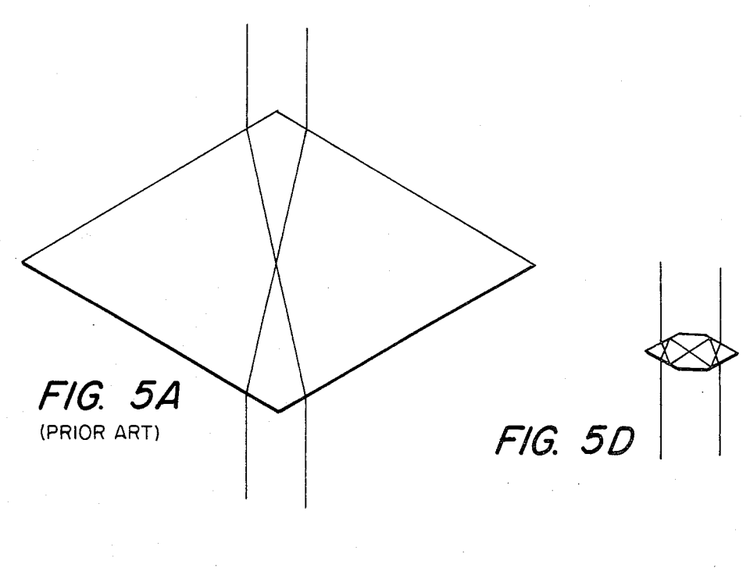
FIG. 5A, 5B and 5C are views of prior art prisms (drawn to scale) for switching two beams having the same beam shift difference.
FIG. 5D is a view of a hexagonal prism (to scale) in accordance with the invention for switching two beams the same beam shift distance as that depicted in FIGS. 5A, 5B, and 5C.
Figure 5B:
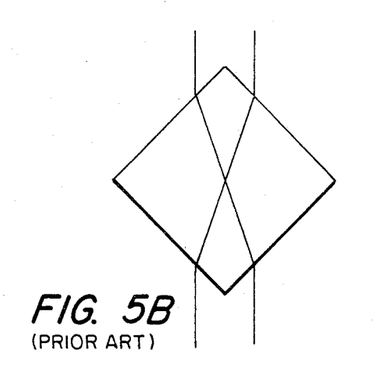
Figure 5C:
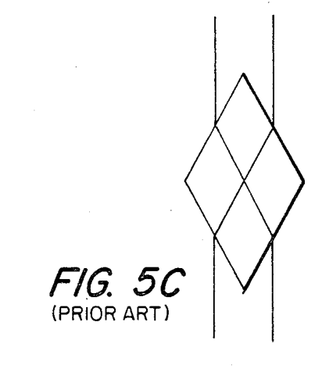

The prism design of Fujii et al. is shown in FIGS. 5A, 5B and 5C with angles of incidence of 30°, 45°, and 60° and a fixed parallel beam separation distance. Each beam enters the prism and is refracted by two precisely parallel facets. Because these facets remain parallel even if the prism as a whole is misaligned, the input and output beams also remain parallel. The smaller angle of incidence in FIG. 5A is desirable in facilitating the anti-reflection coating of the facets, but probably because of the relative prism sizes, the authors fabricated the prisms as in FIG. 5B with a 45° angle of incidence.

Figure 3A:
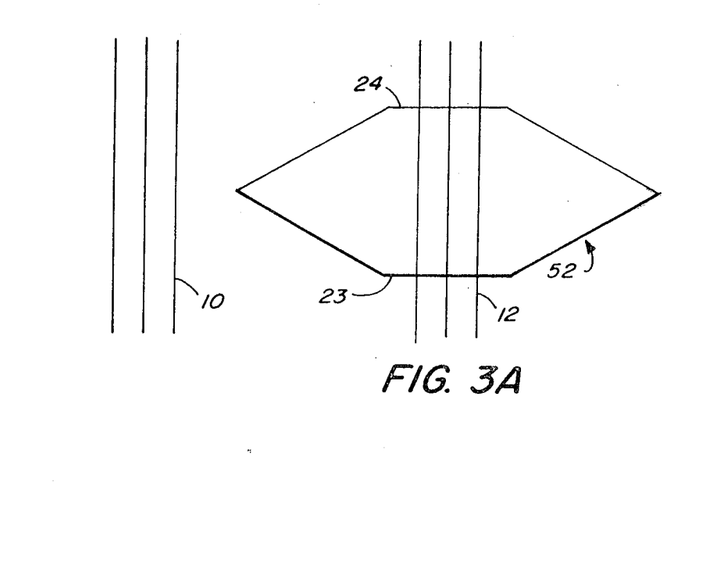
FIG. 3A and 3B are illustrative views showing the effects the two prisms (shown in FIG. 2) have on optical beam paths applied thereto.
Figure 3B:
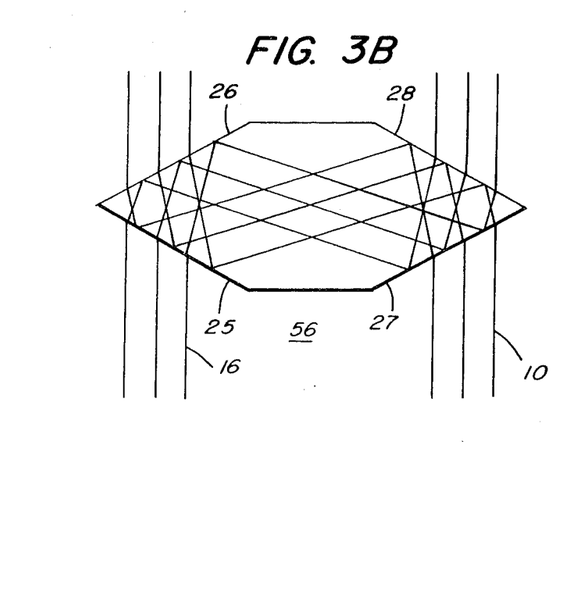

For the present switch of this invention, the new prism design shown in FIG. 5D was used. Each beam in it undergoes total internal reflection on two other parallel facets as well as refraction on the input and output parallel facets. This leads to a far smaller prism size for the same fixed parallel beam separation distance, and an angle of incidence that is near optimum at thirty degrees. Two additional parallel facets truncate the basic rhombic prism shape and these permit a straight through central path midway between the switched beam paths. The prism, when in position as shown in FIG. 3A, passes the right beam undeflected, but when it is translated by a distance equal to half the beam separation distance, as shown in FIG. 3B, it causes a path exchange of light between the right and left beams. The geometry of the central ray of the light path within the prism is detailed in FIG. 6.

Figure 6:
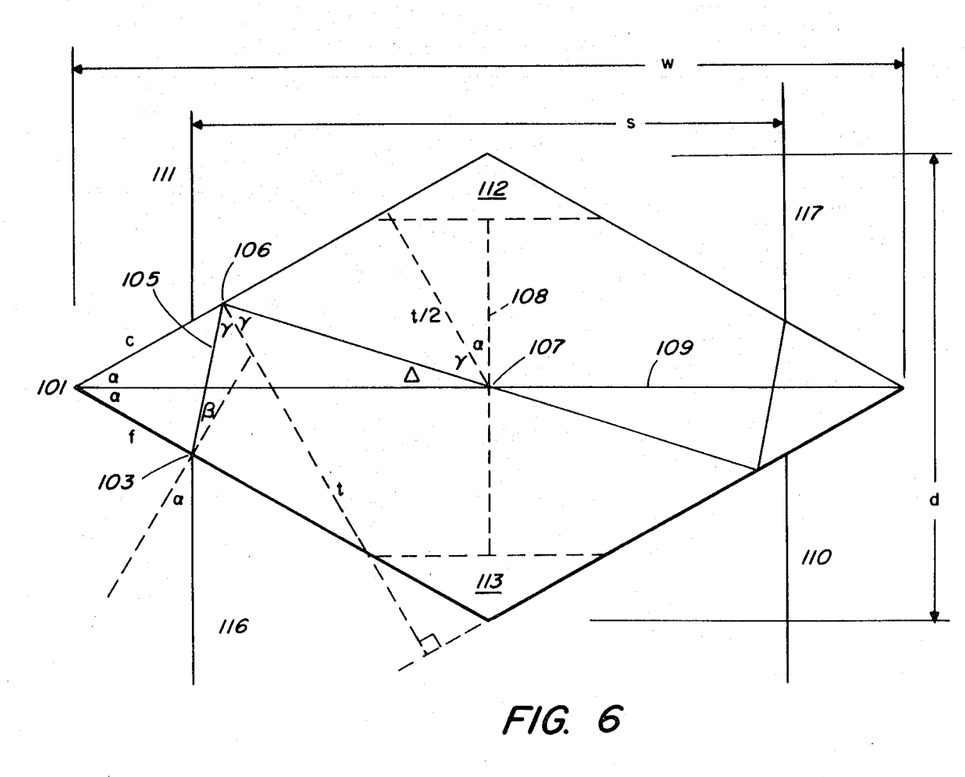
FIG. 6 is an enlarged drawing illustrating the design considerations for various dimensions of the prism in accordance with this invention.

The design considerations for the prism of FIG. 3 will now be discussed using the enlarged and simplified drawing of FIG. 6. Before the top 112 and the bottom 113 corners are truncated to provide for a straight optical path through its center, the prism is also rhombic in form. However, in contrast to the prior art, the point of incidence 103 and the angle of incidence α of the central ray of the beam 116 are chosen such that the refracted ray 105 within the prism is directed toward the point 106 on the adjacent facet, where it undergoes total internal reflection and passes through the prism center at the point 107. The angles on incidence, refraction and reflection, α, β, γ are related by the equation:

$$\gamma = 2\alpha - \beta$$

as is apparent from a view of FIG. 6, and $$\beta = \sin^{-1}\left(\frac{\sin \alpha}{n}\right)$$

which is obtained through the application of Snell's law, which provides that the sine of the angle of incidence bears to the sine of the angle of refraction a ratio which is constant for the same two media, and depends only on the nature of those media. Thus, $$n_1 \sin i_1 = n_2 \sin i_2$$

when $n_1$ and $n_2$ are the indices of refraction of the first and second media, respectively. Hence, for a medium of air, for which $n_1 = 1$, $$n_2 = \frac{\sin i_1}{\sin i_2}$$

Total internal reflection takes place at the point 106 when $n \sin \gamma$ is greater than 1. This leads to the condition that $$n^2 > \frac{1 + 2 \cos 2\alpha \sin \alpha + \sin^2 \alpha}{\sin^2 2\alpha}$$

Figure 7:
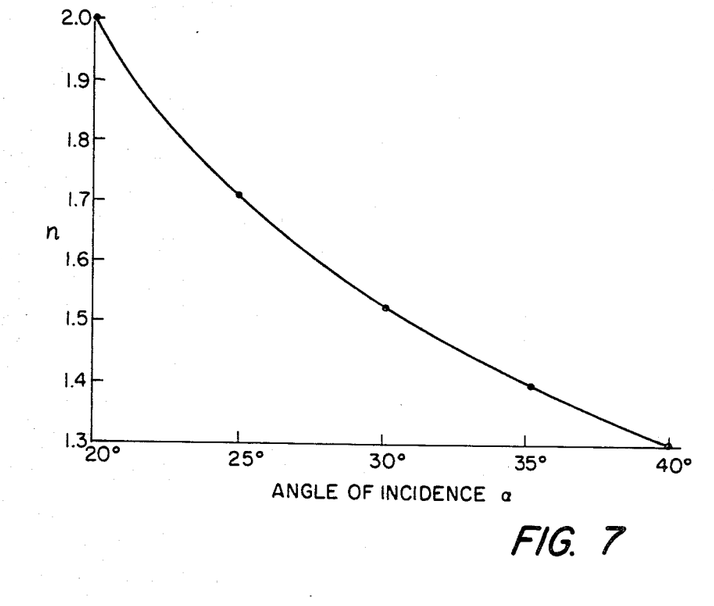
FIG. 7 is a chart illustrating the relationship of the minimum refractive index required for total internal reflection for angles of incidence between 20° and 40°.

The minimum refractive index required for total internal reflection is shown in FIG. 7 for angles of incidence between 20 and 40 degrees. In the preferred design, α is 30°, the prism angle at the corner 101 is $2\alpha = 60°$, and the minimum refractive index is 1.527.

The desired prism size, in terms of t, the perpendicular thickness between parallel facets, is derived in terms of s, the desired beam shift distance. The distance between the points 106 and 107, in FIG. 6, is $t/(2 \cos \gamma)$ and the sum of the angles Δ, α and γ is 90°. From the law of sines, applied to the triangle having corners at 101, 106 and 107 (and the relationship set forth in the previous sentence), the length of side c between the points 101 and 106 is $$c = \frac{t \cos(\alpha + \gamma)}{2 \cos \gamma \sin \alpha}$$

Applying the law of sines to the triangle having corners at 101, 106 and 103 and substituting for c above, the length of side f between points 101 and 103 is $$f = \frac{c \cos \gamma}{\cos \beta} = \frac{t \cos(\alpha + \gamma)}{2 \sin \alpha \cos \beta}$$

Also from the diagram of FIG. 6, it can be seen that $$\frac{s}{2} = \frac{t}{2 \sin \alpha} - f \cos \alpha$$

It therefore follows that substituting for f $$\frac{s}{2} = \frac{t(\cos \beta - \cos(\alpha + \gamma) \cos \alpha)}{2 \sin \alpha \cos \beta}$$

From which the required expressions for t, w and d are $$t = s\left(\frac{\sin \alpha \cos \beta}{\cos \beta - \cos(\alpha + \gamma) \cos \alpha}\right)$$

$$w = \frac{t}{\sin \alpha}$$

$$d = \frac{t}{\cos \alpha}$$

The nominal orientation of the prism is with one plane of symmetry 109 perpendicular to the directions of the incident rays 116 and 110 and with the other plane of symmetry 108 midway between them. It then transposes the paths of rays 116 and 110 such that the output rays 117 and 111 are in line with the input rays 110 and 116, respectively. Because of the fixed parallelism between opposite facets of the prism, the output ray directions remain parallel to their input ray directions for any small angular deviations in the prism orientation. Such angular misorientations only result in lateral offsets of the beams, a condition to which the fiber lens connector bodies are relatively tolerant, and this permits the use of a mechanically simple slide mechanism for activation of the fiber optic switch.

The prisms of this invention are designed for a switch using Schott optical glass type SF15 which has a refractive index of 1.67 at the operating wavelength of 1.3 microns. The beam shift distance s, which is also the radius of the circle 22 in FIG. 1, is chosen to be 0.5 inch. From the foregoing design equations, the facet separation t is computed to be 0.3433 inch. After truncating the corners, the overall prism dimensions are chosen to be 0.28 by 0.65 by 0.15 inch. All six facets through which light passes can be coated to minimize unwanted reflection losses without compromising the efficacy of the total internal reflection.

Each of the beam refractions and reflections introduces an optical differential phase change between the two principal modes of plane polarization and these will be affected by interface coatings. In general, arbitrarily polarized light passing through prism switches such as described herein will emerge with a different state of polarization.

What is claimed is:

1. A prism for exchanging the optical paths of two initially parallel beams by means of four refractions at their entry and exit points and two internal reflections per beam within said prism comprising
    a homogenous transparent solid having a central axis, a first pair of opposed planar faces equally displaced from and parallel to said axis, and a second pair of opposed planar faces equally displaced from and parallel to said axis, there being one face of each pair that contains an entry point and there being the other face of each pair that contains an exit point, there being a plane of symmetry through said prism such that said one face of said first pair that contains said entry point and said other face of said second pair that contains said exit point each forms an angle $\alpha$ with said plane of symmetry, and such that said other face of said first pair that contains said exit point and said one face of said second pair that contains said entrance point each forms said angle $\alpha$ with said plane of symmetry, said entry points and said exit points being so oriented that a first line joining said entry point on said one face of said first pair with said exit point on said other face of said second pair, and a second line joining said exit point on said other face of said first pair with said entrance point on said one face of said second pair are parallel to each other and are each perpendicular to said plane of symmetry, said prism being so constructed that a central ray of one of said two initially parallel beams when impinged upon said entrance point on said one face of said first pair of faces and coaligned with said first line so as to form an angle of incidence with said one face, of said first pair, of said angle $\alpha$,
is refracted at an angle of refraction $\beta$ toward a reflecting point on said other face of said second pair of faces, at an angle of reflection $\gamma$ therewith, then
is reflected at said angle of reflection $\gamma$ toward a reflecting point on said one face of said second pair of faces, at an angle of reflection of said angle $\gamma$ therewith, then
is reflected at said angle of reflection $\gamma$ toward said exit point on said other face of said first pair of faces and then
is refracted at said angle of refraction $\beta$ to coalign with said second line, and said prism being so constructed that a central ray of the other of said two initially parallel beams when impinged upon said entrance point on said one face of said second pair of faces and coaligned with said second line so as to form an angle of incidence, at said one face of said second pair of faces, of said angle $\alpha$,
is refracted at an angle of refraction of said angle $\beta$ toward a reflecting point on said other face of said first pair of faces at an angle of reflection of said angle $\gamma$ therewith, then
is reflected at said angle of reflection $\gamma$ toward a reflecting point on said one face of said first pair of faces, at said angle of reflection $\gamma$ therewith, then
is reflected at said angle of reflection $\gamma$ toward said exit point on said other face of said second pair of faces, and then
is refracted at said angle of refraction $\beta$ to coalign with said first line.

2. The prism as recited in claim 1 further comprising an additional pair of opposed parallel faces, each of said additional faces being equally spaced from and parallel to said plane of symmetry.

3. The prism as recited in claim 2 wherein $\alpha$ is 30°; the distance between said two lines is 0.5 inch, and the distance between one face and the other face of each pair of faces is 0.3433 inch.

4. The prism as recited in claim 3 utilizing Schott optical glass type SF15 having a refractive index of 1.67 at the operating wavelength of 1.3 microns.

5. Apparatus for providing for the exchange redirection of one common optical path with one of a plurality of other optical paths, wherein said plurality of other optical paths are oriented in a circular configuration so that each said other path is parallel to each other and is perpendicular to a plane containing said configuration, said other paths intersecting said plane at intersections whose locus lies in said circular configuration and wherein said common optical path is parallel to said other paths and intersects said plane at the center of said circular configuration, comprising
a like plurality of said prisms, each as recited in claim 1, oriented so that light can pass unimpeded through said other optical paths, and
means for positioning one of said prisms so that the entrance point on one face of a first pair of faces of such prism intersects said common optical path, and so that the exit point on the other face of said first pair of faces intersects an optical path corresponding to the positioned prism so that light can pass from the common optical path, be refracted upon entering the positioned prism, be reflected twice within said positioned prism, and be refracted upon exiting from said last named exit point to coalign with said corresponding optical path.

6. The apparatus as recited in claim 5 wherein said plurality is eight.

7. Apparatus for providing for the exchange redirection of one common optical path with one of a plurality of other optical paths, wherein said plurality of other optical paths are oriented in a circular configuration so that each said other path is parallel to each other and is perpendicular to a plane containing said configuration, said other paths intersecting said plane at intersections whose locus lies in said circular configuration and wherein said common optical path is parallel to said other paths and intersects said plane at the center of said circular configuration, comprising
a like plurality of said prisms, each as recited in claim 1, oriented so that light can pass unimpeded through said other optical paths, and
means for positioning one of said prisms
so that the entrance point on one face of a first pair of faces of such prism intersects said common optical path, and so that the exit point on the other face of said first pair of faces intersects an optical path corresponding to the positioned prism so that light can pass from the common optical path, be refracted upon entering the positioned prism, be reflected twice within said positioned prism, and be refracted upon exiting from said last named exit point to coalign with said corresponding optical path, and
so that the entrance point on one face of a second pair of faces of such prism intersects said corresponding optical path, and so that the exit point on the other face of said second pair of faces intersects said common optical path so that light can pass from said corresponding optical path, be refracted upon entering the positioned prism, be reflected twice within said positioned prism, and be refracted upon exiting from said last named exit point to coalign with said common optical path.

* * * * *